METHOD AND APPARATUS FOR CHROMATOGRAPHY SAMPLE PREPARATION

Filed July 8, 1969 5 Sheets-Sheet 1

INVENTORS
LEO V. AZARRAGA
ORVILLE F. FOLMER, JR.
BY
William A. Mikesell Jr.
ATTORNEY

METHOD AND APPARATUS FOR CHROMATOGRAPHY SAMPLE PREPARATION

Filed July 8, 1969

INVENTORS
LEO V. AZARRAGA
ORVILLE F. FOLMER, JR.
BY
William A. Mikesell Jr.
ATTORNEY INVENTORS
LEO V. AZARRAGA
ORVILLE F. FOLMER, JR.
BY
William A. Mikesell Jr.
ATTORNEY INVENTORS
LEO V. AZARRAGA
ORVILLE F. FOLMER, JR.
BY
William A. Mikesell Jr.
ATTORNEY

METHOD AND APPARATUS FOR CHROMATOGRAPHY SAMPLE PREPARATION

INVENTORS
LEO V. AZARRAGA
ORVILLE F. FOLMER, JR.
BY
William A. Mikesell Jr.
ATTORNEY 3,511,029

METHOD AND APPARATUS FOR CHROMATOGRAPHY SAMPLE PREPARATION

Leo V. Azarraga and Orville F. Folmer, Jr., Ponca City, Okla., assignors to Continental Oil Company, Ponca City, Okla., a corporation of Delaware Continuation-in-part of application Ser. No. 766,220, Oct. 9, 1968. This application July 8, 1969, Ser. No. 842,819
Int. Cl. B01d *15/08*
U.S. Cl. 55—67 5 Claims

ABSTRACT OF THE DISCLOSURE

Solid and liquid samples are prepared for analysis by gas-liquid chromatography by laser-induced vaporization and/or molecular fragmentation.

CROSS REFERENCE TO RELATED APPLICATION

This application is a continuation-in-part of co-pending U.S. Ser. No. 766,220, filed Oct. 9, 1968, and now abandoned.

DISCLOSURE

This invention relates to analysis of solid or liquid materials by chromatography. More specifically, the invention relates to preparation of such materials for analysis by pyrolyzing a portion thereof with a laser beam.

The use of chromatography as an analytical tool has been increasing greatly, and the methods and apparatus available have been improving rapidly. Simply stated, gas-liquid chromatography generally involves injection of a slug of sample vapor to be analyzed into a flowing stream of inert gas, known as carrier gas. The stream containing the slug of sample vapor is then passed to a separation zone wherein it contacts a partitioning agent which is usually coated on a particulate solid support. The partitioning agent, often a liquid or a waxy or resinous solid, is chosen to exhibit varying degrees of affinity for the various components of the sample vapor, with the result that the emerging carrier gas stream contains zones of separated sample components. Detection of the shape and size of such component zones, as by measuring the thermal conductivity of the emerging gas stream, completes the analysis. Comparison of the zone or peak size, shape and sequence with those of known components under the same conditions permits their interpretation as to component identity and even quantity. It is obvious, however, that this analytical technique requires that the sample be in gas or vapor form. Materials not readily volatilized, such as liquids or solids, have been analyzed chromatographically by pyrolyzing or thermally disintegrating the sample molecule into gaseous fragments, and separating the fragments into peaks. The resulting peak trace is useful either by actually identifying the chemical species responsible for each peak, or by comparison of the trace shape to that of known materials in a manner analogous to fingerprinting or voice-printing. However, past techniques for pyrolyzing such samples in preparation for analysis have exhibited certain disadvantages. Among the more significant of these are, first, that peak traces have been typically very complex, making comparison difficult, secondly, that pyrolysis conditions have been difficult to duplicate from one sample to the other, with the resulting lack of reproducibility, thirdly, that the pyrolysis has on occasion resulted in the peak traces of different materials being similar or virtually identical in shape, and finally, the surrounding environment is unduly heated by operation of such devices for the relatively long time period required, especially when e.g. enclosed in a cabinet.

It is accordingly an object of this invention to provide a novel chromatographic analysis method and apparatus. Another object of the invention is to provide a method for preparing a sample for chromatographic analysis which will result in a less complex, more reproducible, or more selective result. Other aspects, objects, and the several advantages of the invention will become apparent upon study of this disclosure, the appended claims, and the drawings, in which:

Figure 1:
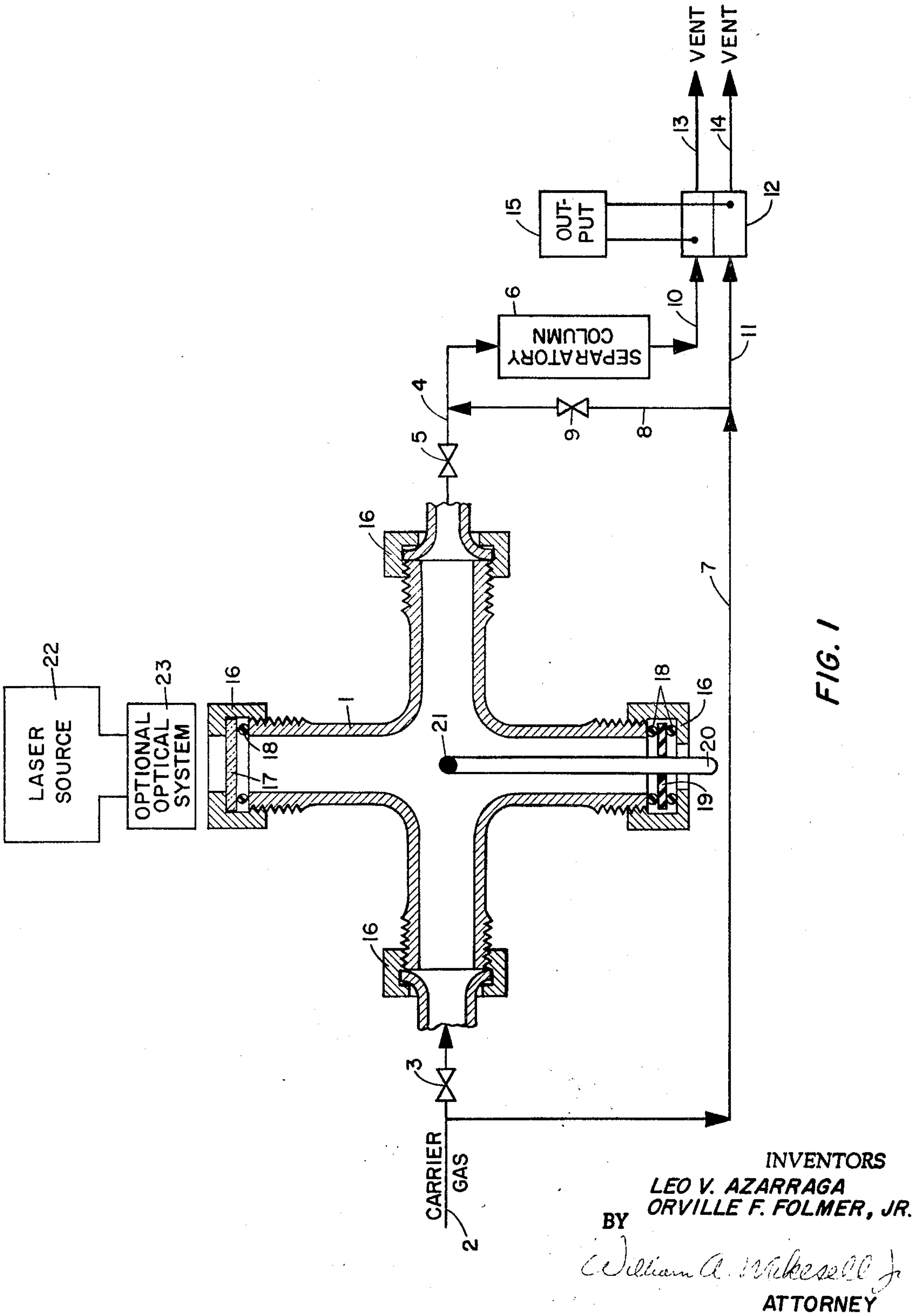
FIG. 1 is a schematic diagram of apparatus suitable for practice of the invention.

We have now discovered that solid and liquid materials can advantageously be analyzed or identified chromatographically by bombarding them with laser energy, and analyzing the resulting vaporous products. The invention will now be further illustrated by reference to the drawing.

FIG. 1 is a schematic representation of an apparatus suitable for practice of the invention. A sample chamber, indicated generally as 1, is connected at one arm to a carrier gas inlet 2 via valve 3. The opposite arm of the chamber is connected via conduit 4 and valve 5 to the chromatographic column 6. The carrier gas inlet 2 is also connected via by-pass conduits 7 and 8 and valve 9 to conduit 4. The outlet of column 6 and the by-pass conduit are connected respectively via conduits 10 and 11 to a detector cell 12. These two streams are then vented or suitably disposed of via conduits 13 and 14. Detector cell 12 is also connected to a suitable output 15, such as a bridge circuit and strip recorder as is known in the art. Returning now in detail to sample chamber 1, this can suitably comprise a "cross" plumbing fitting provided with flare-engaging nuts 16 at the ends of its arms. Sealing off the upper arm is an optical window 17 of such as glass, Pyrex or Vycor and a gasket or O-ring 18. Gas inlet and outlet connections to conduits 2 and 4 in opposing arms can comprise flare or other suitable connections. The remaining arm is fitted with a septum 19 of e.g. rubber which can be sealed by gaskets 18. A rod 20 penetrates septum 19, and has positioned on its end the specimen 21 to be analyzed. Finally, a laser source 22 and an optional optical system 23, which can consist of focussing and aiming devices as known, are positioned so as to be capable of transmitting a laser beam through window 17 to specimen 21.

Operation of the device of FIG. 1 is as follows. Valves 3 and 5 are closed, valve 9 is opened, and carrier gas is flowed continuously into the system via conduit 2. Carrier gas thus flows through column 6 to one half of detector cell 12, and directly through the other half of the cell. While the column and detector cell come to thermal equilibrium, the specimen can be mounted. This can be done by removing rod 20, attaching specimen 21, and re-inserting rod 20. Valves 3 and 5 are then opened, and valve 9 closed, placing the sample chamber into the column circuit. A laser pulse is then fired from source 22, causing specimen 21 or a portion thereof to vaporize. About simultaneous with firing of the laser pulse, the recorder of output device 15 is started. Vaporized components of specimen 21 are accordingly chromatographically analyzed and recorded in conventional manner. The entire sample chamber, piping, and analytical apparatus can be provided with suitable temperature control means, such as thermostatted jacketing not shown, in known manner.

Laser source 22 can comprise any laser beam emitter capable of discharging a short burst of high-intensity coherent light. Although we do not wish to be so bound, we presently spectulate that the unique nature of the analytical capability of our invention is due, at least in part, to the tremendously rapid rise and fall in temperature of a specimen subjected to a pulse of laser energy. Conventional methods of pyrolyzing a specimen for chromatographic analysis, such as use of a furnace or a hot wire, exhibit an inherent thermal lag which in turn permits many side reactions between pyrolysis products; the ultimate product of such methods is typically a highly complex mixture. Depending upon the diameter of the emitted laser beam, one may or may not wish to focus the beam on the specimen 21; if this is desirable, it can be effected conventionally by optical system 23, using e.g. a microscope or a simple converging lens. It is also noted that the prior-art methods of vaporizing a sample have herein been characterized as pyrolysis; whether a specimen subjected to a laser beam is pyrolyzed in the classic sense or not is immaterial to the present invention, the requirement being that the solid or liquid specimen be converted to the gas or vapor state virtually instantaneously.

The invention will now be further illustrated by referring to the following specific examples.

Example 1

Figure 2C:
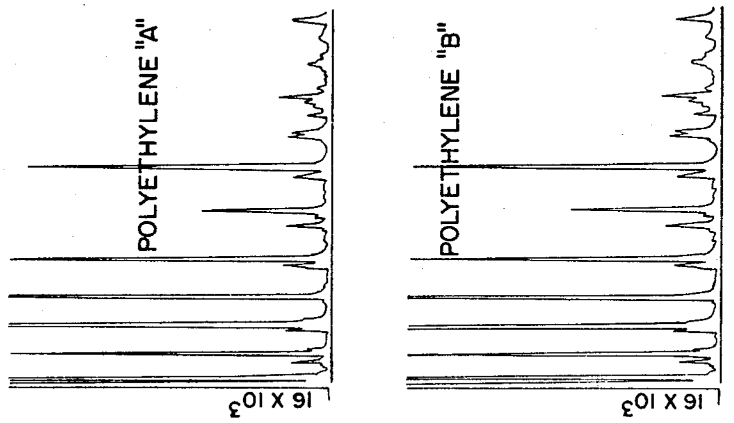
FIGS. 2A–5A are chromatographic traces of various materials produced by analysis according to the invention.
FIGS. 2B and C–5B and C are chromatographic traces of these same materials as pyrolyzed by other methods.
Figure 2B:
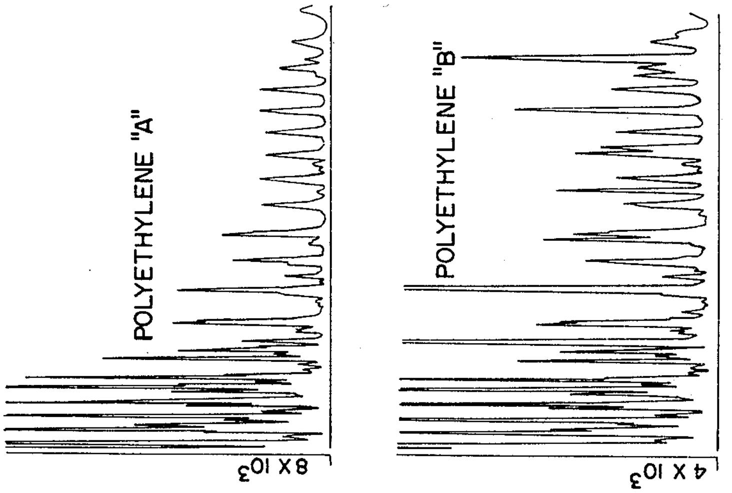

Samples of two different types of polyethylene were selected for characterizing by chromatography. One, labelled as polyethylene "A" in FIGS. 2A, 2B and 2C, was a commercial DYLT and the other, labelled polyethylene "B" in these figures, was black-pigmented polyethylene not otherwise identified. Portions of the two specimens were subjected to laser pyrolysis according to the present invention, and the pyrolysis products produced the chromatographic traces shown in FIG. 2A. Other portions were subjected to pyrolysis on a heated filament, and these pyrolysis products produced the traces shown in FIG. 2B. Finally, portions of the product subjected to pyrolysis in a heated oven yielded the traces shown in FIG. 2C.

Figure 2A:
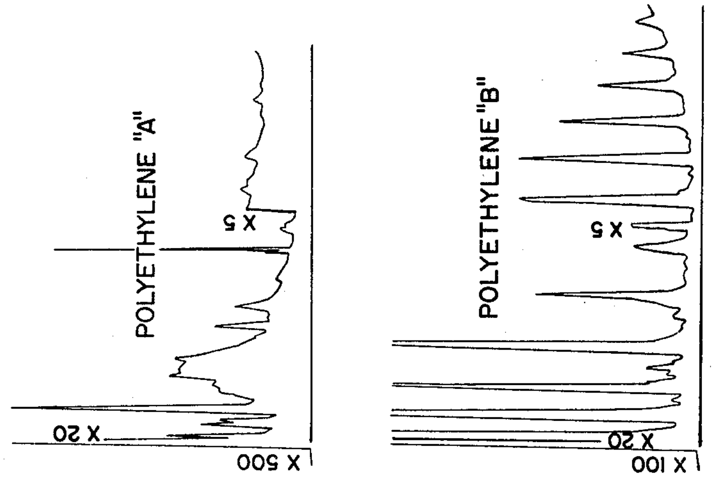

The laser used for pyrolysis according to this invention to yield the vapors which produced the traces of FIG. 2A was a ruby laser, the ruby being a 3¼" long rod of ¼" diameter, pumped by two xenon flash tubes, and had an energy output of about 0.25 joule with a pulse duration of 400 $\mu$sec. The laser beam was focussed with a single simple lens onto the specimen, which was contained in a sample chamber similar to that of FIG. 1. The heated filament pyrolyzer of the prior art used to vaporize the samples which yielded the traces of FIG. 2B was an F and M model 80 consisting of a platinum ribbon bent into a W shape with the sample folded into the center portion; the filament was heated by passing electric current through it to produce a pyrolysis temperature of 1000° C. Tube furnace pyrolysis of the prior art was effected by a device based on a Hamilton Multipurpose Sampling System, and comprised dropping the sample into a quartz tube preheated to 800° C.

In all instances, the vapors resulting from sample pyrolysis were led into a chromatographic column of 6 foot length and about ⅛" diameter, packed with silicone gum rubber on diatomaceous earth.

Example 2

Figure 3C:
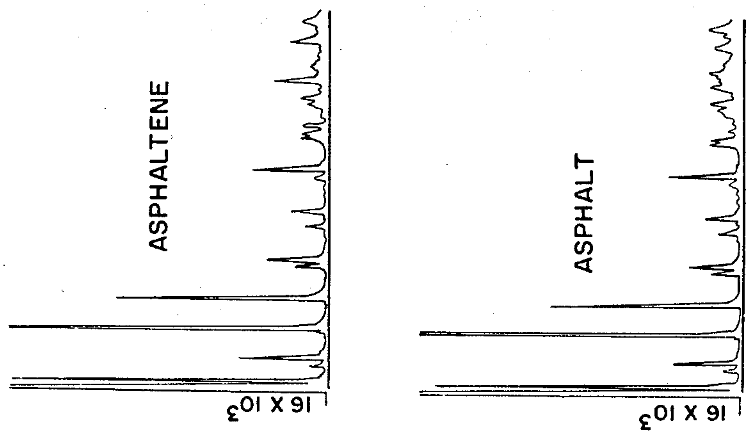
Figure 3B:
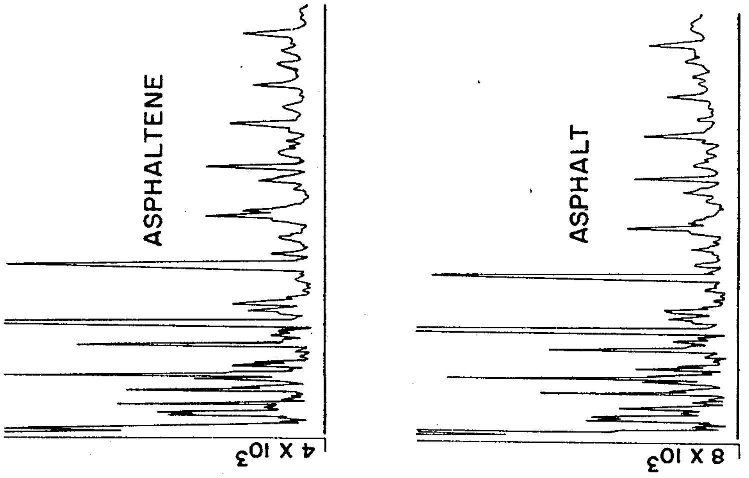
Figure 3A:
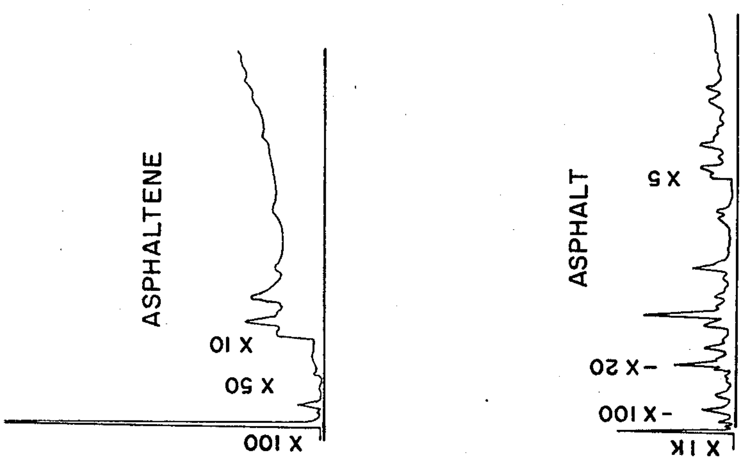

An asphaltene and an asphalt were compared for characterization by the three pyrolysis methods and using the three types of apparatus described in Example 1. The chromatographic traces, derived by using the analytical equipment of Example 1, are shown respectively as: laser, FIG. 3A; filament, FIG. 3B; and furnace, FIG. 3C.

Example 3

Figure 4C:
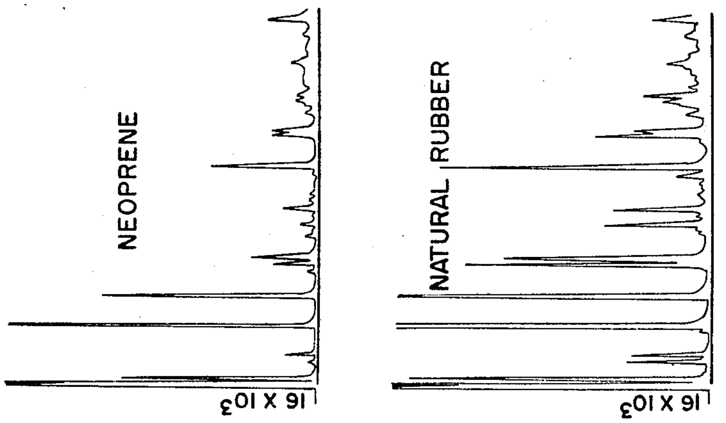
Figure 4B:
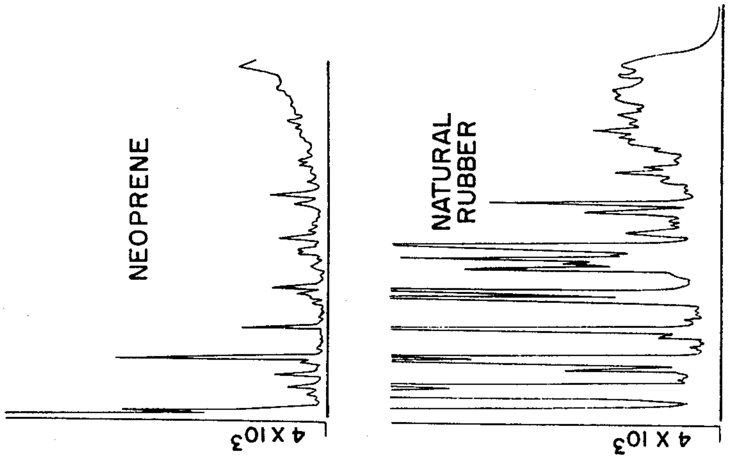
Figure 4A:
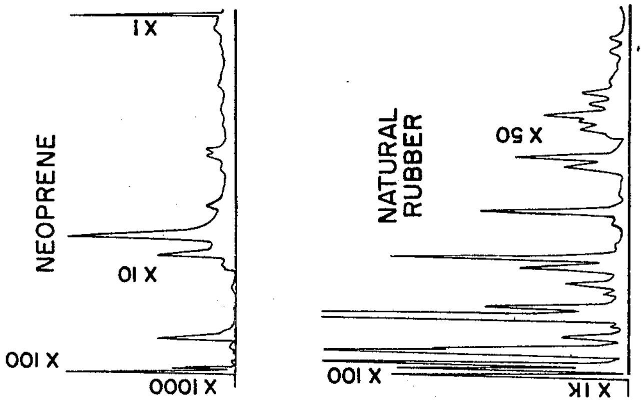

A neoprene (chlorine-containing synthetic rubber) and a natural rubber (hydrocarbon) were compared for characterization in the manner of Example 2, with FIG. 4A showing pyrolysis by laser, 4B by filament, and 4C by furnace.

Example 4

Figure 5C:
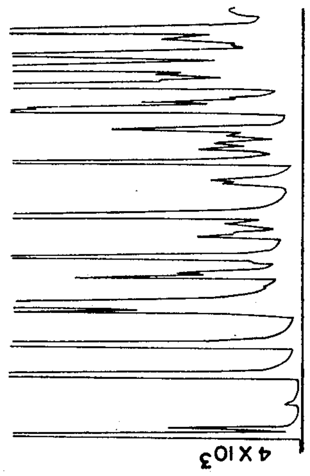
Figure 5B:
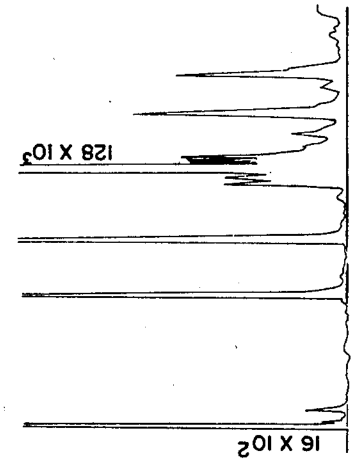
Figure 5A:
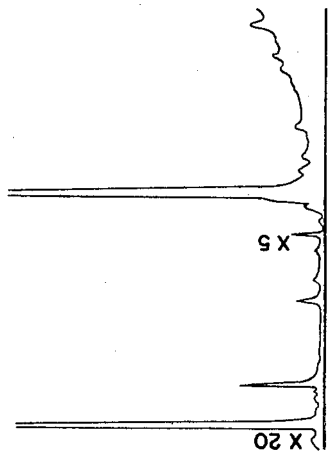

A polystyrene sample was characterized in the manner of Example 2, with the trace of FIG. 5A showing the results of pyrolysis by laser, 5B by filament, and 5C by furnace.

In all instances of Examples 1–3, it can be seen that comparison of the traces or fingerprints produced by two different materials exhibits differences which are most readily apparent when the materials are pyrolyzed or vaporized by laser according to the present invention, followed in most instances by filament pyrolysis in degree of decreasing difference, and further, that the traces produced for two different materials by furnace pyrolysis are virtually identical.

Although the present invention finds great utility in pyrolyzing specimens of low volatility, e.g. solids or heavy liquids, the invention is also advantageous for identification of more volatile liquids such as solutions or suspensions of organic or inorganic compounds in water or organic liquid, in that the extremely short pulse of energy used to pyrolyze the specimen does not cause the environment surrounding the device to become heated, as contrasted to conventional sample vaporizer or pyrolysis devices. The only requirement for the present invention is that the specimen show some degree of opaqueness for the particular light wavelength being used.

Having thus described the invention by providing specific examples thereof, it is to be understood that no undue limitations or restrictions are to be drawn by reason thereof and that many variations and modifications are within the scope of the invention.

What is claimed is:

1. In the method of analyzing a substance wherein a slug of vapors derived from said substance is admixed with a carrier gas, and the resulting mixture of vapors and carrier gas is passed through a chromatogaphic separation zone which selectively retards constituents thereof, the improvement which comprises generating said vapors from said substance by subjecting the latter to a laser beam pulse.

2. The method of claim 1 wherein said substance to be analyzed is a solid or a liquid of low volatility.

3. The method of claim 1 wherein said pulse is of a duration of at most about 500 microseconds.

4. The method of claim 1 wherein said generating is effected over a period of time of at most about 500 microseconds.

5. Analytical apparatus comprising in combination:

(a) laser means for generating a beam of coherent light;

(b) chromatographic separation means for selectively retarding constituents of a vapor upon passage from an inlet end to an outlet end thereof;

(c) means for exposing a substance to the beam of said laser means;

(d) means for passing a carrier gas from said means for exposing to the inlet end of said separation means; and (e) means for detecting passage of said constituents operatively connected to said outlet end.

References Cited

UNITED STATES PATENTS

| | | | |
|---|---|---|---|
| 3,057,692 | 10/1962 | Van Kirk et al. | 55—67 X |
| 3,389,538 | 6/1968 | Carel | 55—386 |

OTHER REFERENCES

Schawlow, Arthur L.: "Optical Maser," Scientific American, vol. 204, No. 6, June 1961, pp. 52–61.

Schawlow, Arthur L.: "Advances in Optical Masers," Scientific American, vol. 209, No. 1, July 1963, pp. 34–45.

JAMES L. DECESARE, Primary Examiner

U.S. Cl. X.R.

331—94.5